Oct. 30, 1928.  1,689,635
N. M. MARSILIUS
MILLING MACHINE
Filed Dec. 14, 1925   4 Sheets-Sheet 1
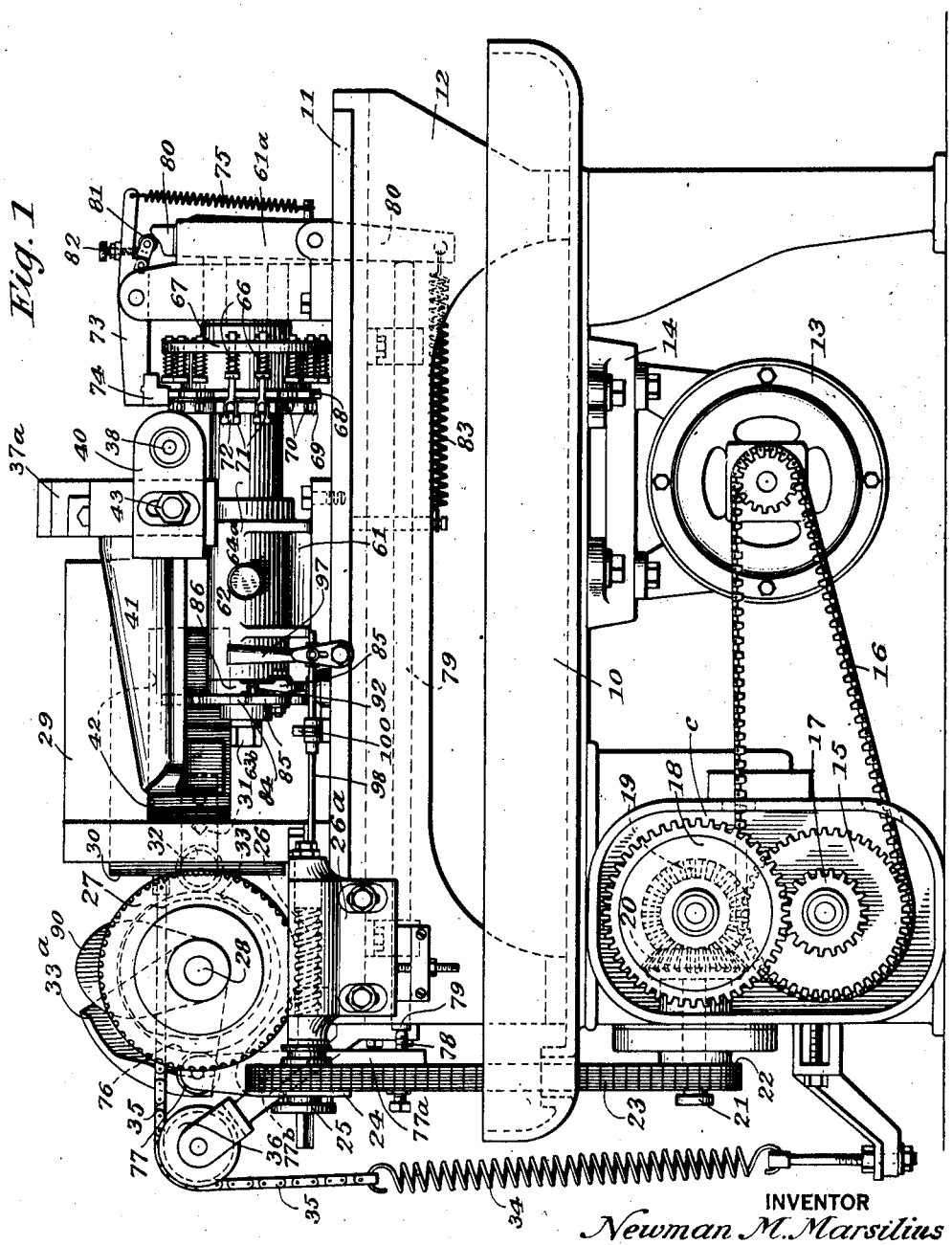
INVENTOR
Newman M. Marsilius
BY
Chamberlain & Newman
ATTORNEYS

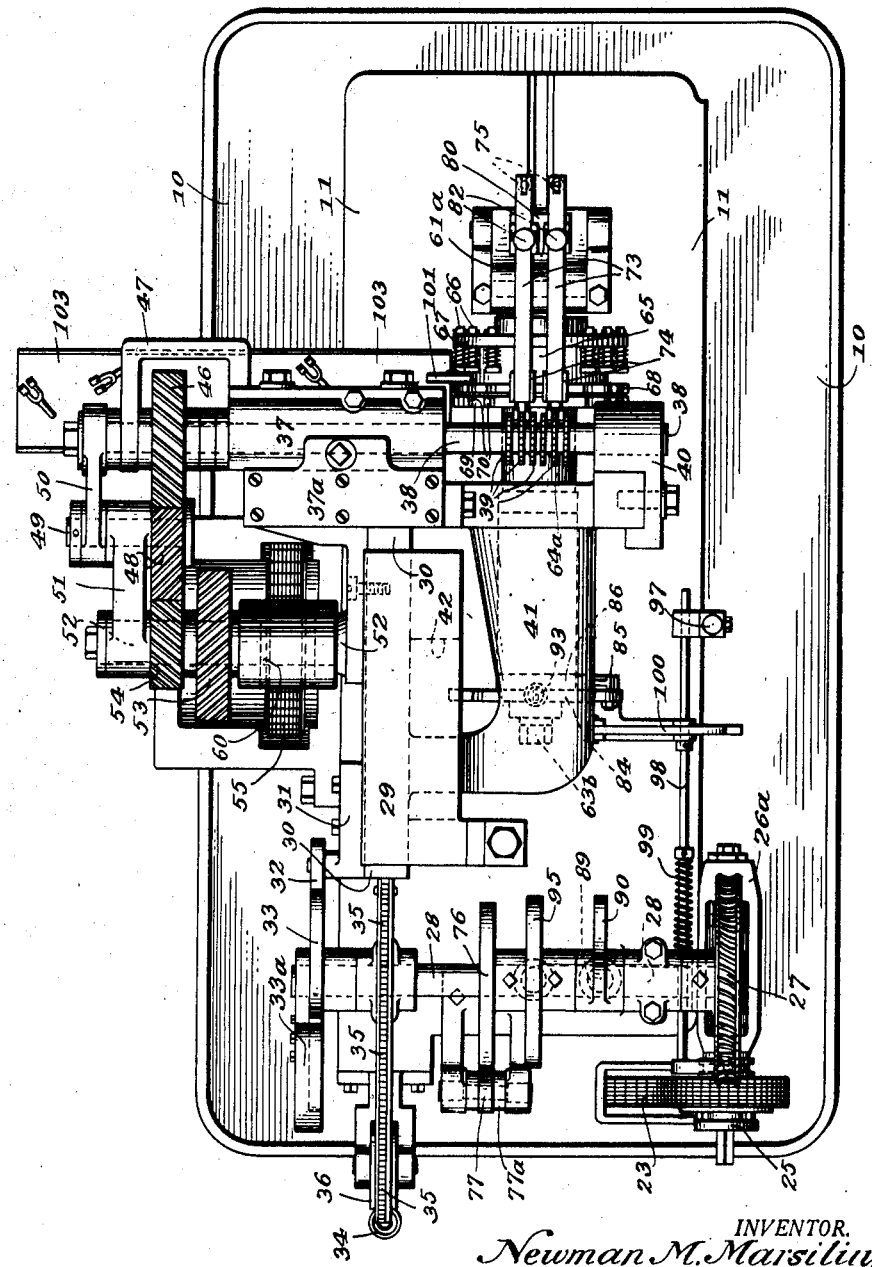

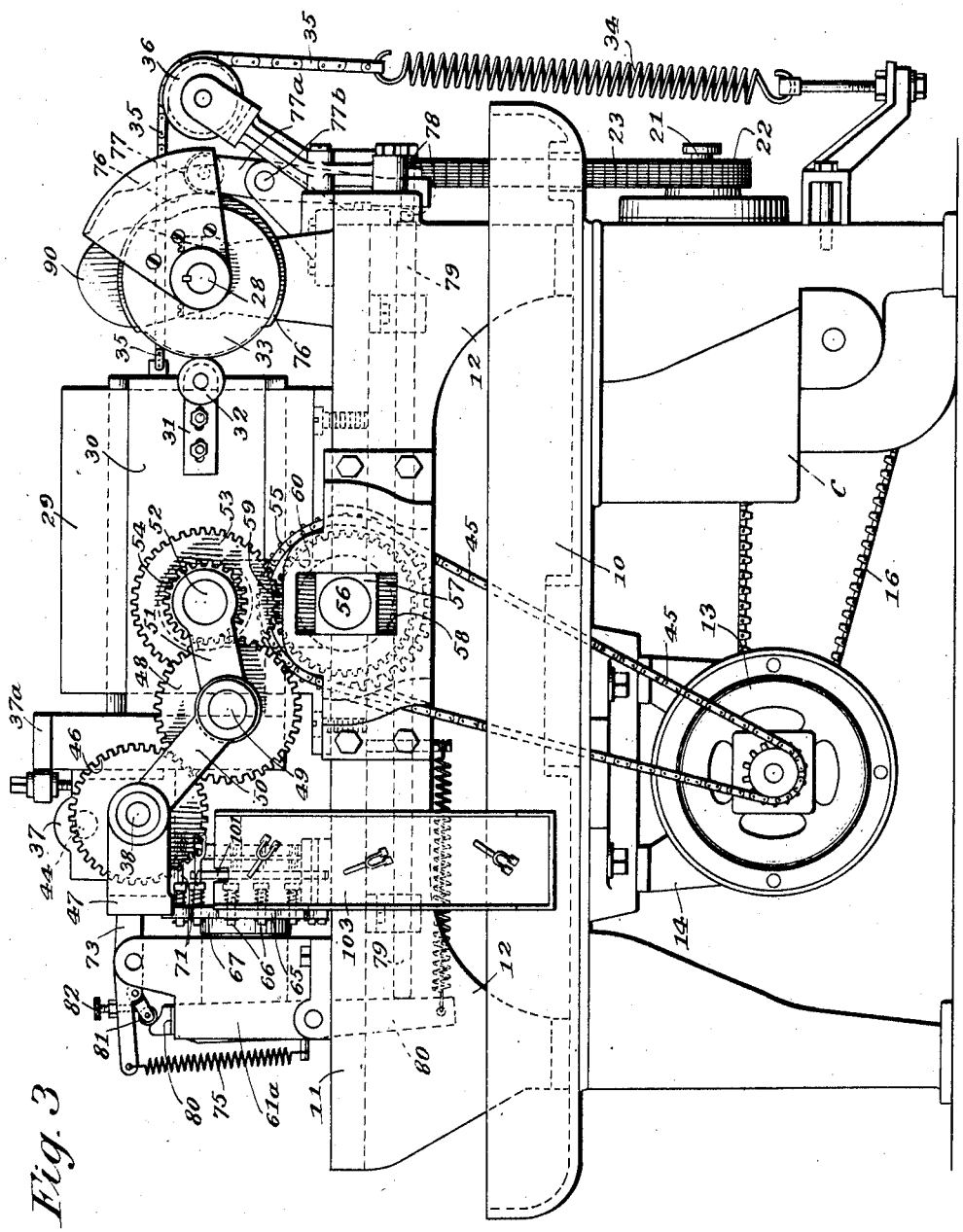

Oct. 30, 1928.
N. M. MARSILIUS
MILLING MACHINE
Filed Dec. 14, 1925
1,689,635
4 Sheets-Sheet 4
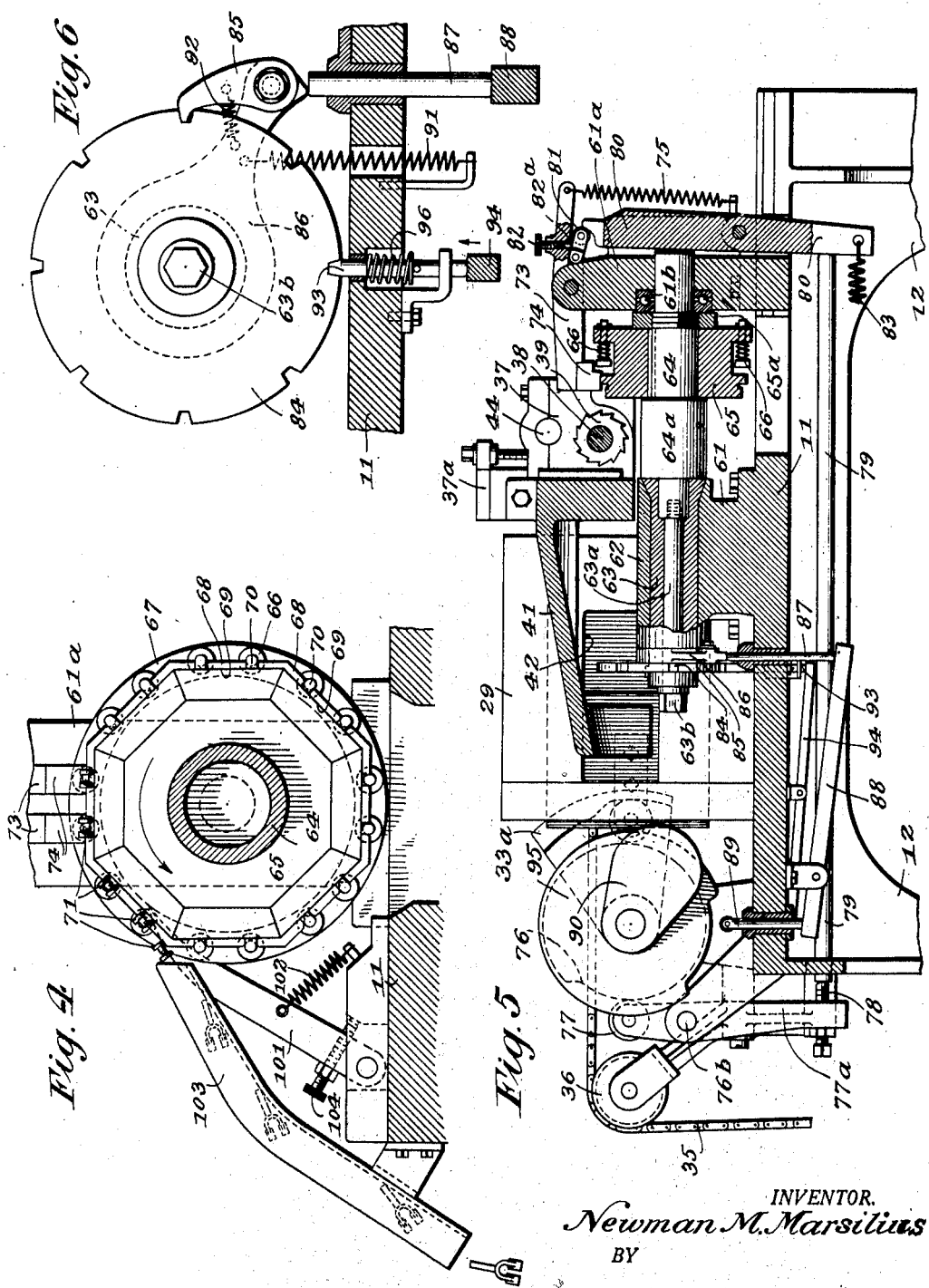
INVENTOR.
Newman M. Marsilius
BY
Chamberlain + Newman
ATTORNEYS.

Patented Oct. 30, 1928.

1,689,635

UNITED STATES PATENT OFFICE.

NEWMAN M. MARSILIUS, OF BRIDGEPORT, CONNECTICUT, ASSIGNOR, BY MESNE ASSIGNMENTS, TO THE PRODUCTO MACHINE COMPANY, OF BRIDGEPORT, CONNECTICUT, A CORPORATION OF CONNECTICUT.

MILLING MACHINE.

Application filed December 14, 1925. Serial No. 75,276.

This invention relates to metal working and has particular reference to new and useful improvements in milling machines.

One object of the invention is to generally improve the type of milling machines shown in prior Patents Nos. 991,464 and 1,061,973 of May 2, 1911 and May 20, 1913, respectively.

Other objects are to provide in a machine of this class, means whereby the cutter or cutters are positively driven and wherein the cutter carrying shaft is supported in bearings at each side of the cutters, to provide for the operation of the machine at different speeds and on different sizes and kinds of work; to provide means for simultaneously operating on a plurality of pieces of work, such machine preferably employing a plurality of cutters.

Further objects and advantages will become apparent from a consideration of the following description taken in connection with the accompanying drawings, wherein, for the purpose of illustration, there is disclosed one satisfactory embodiment of the invention and in which:—

Fig. 1 is a side view of the improved milling machine as seen from the left of the front thereof, the view for the most part being in elevation;

Fig. 2 is a plan view of the complete machine;

Fig. 3 is a side elevational view of the machine looking at the opposite side from that shown in Fig. 1;

Fig. 4 is an enlarged detail view, partly in section of the turret, the means for stripping the finished work therefrom being also shown;

Fig. 5 is an enlarged view, partly in longitudinal section and partly in elevation, showing the means for indexing the turret and the means for holding the pieces of work while they are operated on; and Fig. 6 is an enlarged detail view of the pawl and ratchet mechanism for giving the turret a step by step turning movement and the locking bolt for holding the turret during the milling operation.

Referring in detail to the accompanying drawings wherein similar reference numerals refer to corresponding parts throughout the several views, 10 indicates a stand or bench upon which is mounted the bed 11 carrying the machine proper. The bed 11 is disposed above the bench, it being provided with short legs 12.

A motor 13 is disposed beneath and secured to the bench by a suitable support 14. This motor drives sprocket 15 through chain 16. By means of gears 17 and 18, sprocket 15 drives beveled pinions 19 and 20 which rotate shaft 21 carrying sprocket 22 for driving chain 23. This gearing is enclosed in a casing c. Chain 23, through sprocket wheel 24 and clutch 25, drive a worm 26 which, as best shown in Fig. 1, is mounted in a vertically adjustable bearing 26ª. A worm gear 27 fixed to cam shaft 28, meshes with and is driven by the worm 26.

Secured to the table 11, is a frame or guide 29 in which a slide 30 is mounted for horizontal reciprocating movement. A bracket 31 is adjustably secured to the slide and carries a roller 32 which is held in contact with cam 33 by suitable means, as for instance a coil spring 34 which through flexible connection 35 tends to pull the slide toward the rear of the machine. This flexible connection 35 passes over an idler 36 which serves to hold it clear of the machine. The cam 33 acts to push slide 30 forward and cam 33ª together with spring 34 acts to return the slide. Thus at each revolution of shaft 28 the slide completes a forward and backward movement.

Carried by a slide 30, at its forward end is a head 37ª on which is carried a bearing 37 in which is mounted a cutter spindle 38 carrying cutters 39, here shown as six in number. The spindle is supported at one side of the cutters by this bearing 37 and at their other side by a bearing 40 on arm 41, the rear end of which is offset laterally and secured to or formed integral with slide 30. This arm of course moves with the slide and its offset portion operates through a slot 42 in the guide or frame 29. Bolt and slot connection 43 provides for vertical adjustment of bearing 40 while bearing 37 is likewise adjustable on head 37ª, these adjustments providing for operation of the machine on different sizes and kinds of work.

Bearing 37 might be termed a double bearing since when the machine is used on certain kinds of work a shaft is journaled in the upper portion thereof where plug 44 is shown (Fig. 5).

The cutter spindle is driven from motor 13 through chain 45 and suitable interposed gearing now to be described. Gear 46 is secured to spindle 38 to turn the same and is mounted in bracket 47 of bearing 37 whereby it is rigidly supported. The gear 46 meshes with and is driven through an idler gear 48 mounted upon a stud 49 carried by and forming a pivot for the connecting ends of links 50 and 51. The forward end of said link 50 is pivotally connected to the outer end portion of the hub of the bracket 47 while the rear end portion of the second link 51 is mounted upon a stud 52 secured to the before mentioned slide 30 and upon which a driven gear 53 is also mounted and thus carried by the slide in its forward and backward travel. A gear 54 is connected with the driven gear 53 in a way to be driven thereby and in turn meshes with and drives the idler 48 which as before stated is connected with the gear 46 to drive the cutter spindle.

Power taken from the motor by chain 45 is applied to sprocket 55 on stud 56 which is carried by a bearing block 57 mounted in a slot 58 and adapted for a limited vertical movement therein. Also secured to stud 56 is a gear 59 which meshes with and drives the said driven gear 53. Studs 52 and 56 are rigidly connected by an arm 60 (Fig. 3) and consequently gears 53 and 59 are always held in mesh. Idler gear 48 being supported by links 50 and 51 is movable relative to the gears with which it meshes. When slide 30 starts forwardly, block 57 rises in slot 58 owing to stud 56 being pulled by stud 52 through link or arm 60 and as gear 54 tries to walk around idler gear 48, the idler moves downwardly thus compensating for relative movement of gears 46 and 54. It will of course be understood that all relative movement of these gears is very minute.

From the foregoing it will be seen that a separate and independent driving connection for the cutters is provided. This connection is positive and not only permits of an increased amount of power being applied to the cutter spindle but also provides for the vertical adjustment of the spindle without changing the position of sprocket 55, which remains at substantially the same distance above the motor from which it is driven.

An upright 61 is secured to bed 11 and carries a bearing 62 in which is disposed a sleeve or bushing 63 mounting a shaft 64 on which is keyed a turret or work carrier 65. Shaft 64 is mounted at right angles to spindle 38 and is horizontally disposed. An upright 61ª carrying a ball bearing 61ᵇ supports the forward end of shaft 64. Turret 65 is drawn into engagement with one end of enlarged portion 64ª of shaft 64 by nut 65ª while one end of sleeve 63 is drawn into engagement with the other end of portion 64ª by means of bolt 63ª and nut 63ᵇ. In this way all these parts are secured together to move as a unit. The turret 65 is adapted to be indexed or given a step by step turning movement and may be divided into any number of sections, there being eight shown (see Fig. 4) each of which is designed to hold two pieces of work. Spring plungers 66 are provided in pairs on the turret, being carried in its forward flange 67. The intermediate and rear flanges 68 and 69 respectively of the turret, are octagonal (Fig. 4), the intermediate flange 68 being provided with pairs of V-shaped grooves on each of its faces and the rear flange being similarly provided with lugs 70.

The turret described is for use when the machine is operating on parts such as the yokes 71, shown in Fig. 1. As cast these yokes have a part 72 that is removed in the milling operation. Also the outer sides of the arms of the yokes are milled to finish them. In operation three cutters engage simultaneously a piece of work. These yokes are placed in the machine by pressing their stems against the heads of the plungers 66, (which have depressions for receiving part of the stems) and after depressing the plungers lowering the yokes so that the lugs 70 enter the openings in rear of the parts 72 of the yokes, the stems entering the V-shaped grooves in the flange 68 and eight of the yokes being pressed into contact with the lugs by the spring on the plungers 66. Additional means is provided for securing the work in the turret during the time it is being milled. This means includes pivoted arms 73 having blocks 74 at their forward ends for clamping the stems of yokes 71 in the V-grooves. Blocks 74 are normally held in inoperative position by coil springs 75. A cam 76 on shaft 28 engages roller 77 and moves it and lever 77ª about the latter's pivot 77ᵇ to bring an adjustable screw 78 into contact with rod 79 (which extends longitudinally of the bed 11) to move the same and swing pivoted lever 80 to rock arms 73 to their operative positions. Lever 80 is bifurcated at its upper end and the respective bifurcations engage respective rollers 81, one of which is associated with each of the arms 73, which are adjustable by means of screws 82, a spring actuated pin 82ª being positioned in each of the holes for said screws and adapted to bear upon the link carrying said rollers 81, so as to provide a slightly flexible connection as between the arms 73 and lever 80 to compensate for any slight variation in the differences of engagements of the blocks 74 with the different portions of the surface of the turret 65 as the same is indexed. The parts are held in operative position until cam 76 passes from roller 77 at which time spring 83 returns levers 77ª and 80 and rod 79 to their normal positions while spring 75 returns 73 to normal position.

Each time the cam shaft 28 makes one turn the turret is unlocked, given a one-eighth turn and locked again. This is automatically accomplished by a means to be described. A ratchet wheel 84 is keyed to sleeve 63 and is adapted to be given a step by step turning movement by means of pawl 85 pivotally secured to an arm 86 which is free to turn about sleeve 63. The pawl is adapted to be moved to rotate the ratchet, and with it the turret, one step, by means of a pin 87 which is raised by lever 88 when pin 89 is depressed by cam 90. As soon as pin 87 is released, coil spring 91 attached to arm 86 moves the latter down to the position shown in Fig. 6, spring 91 overcoming the resistance of a spring 92 which holds the pawl in engagement with the ratchet. The locking means for the ratchet includes a bolt 93 which is held in engagement with one of the notches of the ratchet except when the latter is turning. Bolt 93 is held in locking position by means of a lever 94 which is operated by cam 95 through the medium of a vertically sliding pin similar to pin 89. When lever 94 is released from the influence of cam 95, the bolt 93 is depressed by a coil spring 96 which surrounds it.

The clutch 25 above referred to is controlled by handle 97 through a rod 98. Through a bolt and slot connection, as shown in Fig. 1, the rod is vertically adjustable relative to the handle. A spring 99 surrounding rod 98 tends to disengage the elements of the clutch and during the operation of the machine this action is prevented by latch 100.

In Fig. 4 is detailed the means for removing the finished pieces from the turret. This means includes a dog 101 which is pivoted to bed 11 and held in contact with the turret by means of a spring 102. The dog engages the turret just in the rear of the plungers 66 and engages the finished work and raises it from the lugs 70 permitting it to fall into the chute 103 from which it passes into a receptacle or onto a conveyor. A set screw 104 provides for adjustments of dog 101.

While I have shown and described a preferred and satisfactory embodiment of my invention, it is to be understood that it is not limited to the details of construction shown and described, but that changes in construction and arrangement of parts may be made within the spirit and scope of the invention as claimed.

Having thus described my invention what I claim is:—

1. In a milling machine, a frame, a slide mounted for reciprocating movement in said frame, a bearing carried by said slide, a spindle having one end mounted in said bearing, a cutter on said spindle, an offset arm on said slide, said arm carrying a bearing receiving the other end of the spindle so that the cutter is arranged between two bearings and steadied thereby, and a work holder arranged in advance of the spindle and toward and away from which the spindle and cutter are adapted to be moved as the slide is reciprocated.

2. In a milling machine, a work holder, a cutter carrying spindle, means including a slide to move the spindle toward and from the work-holder, and means for rotating the spindle, said last named means including a gear on the spindle, a stud carried by the slide, a pair of gears on the stud adapted to rotate together, a pair of links loosely connected at their remote ends respectively to said spindle and stud, a stud rotatably supportd by th adjacent ends of said links and carrying an idler gear meshing with the gear on the spindle and with one of the gears on the first mentioned stud, a gear mounted on a movable bearing block and meshing with and driving the second gear on the first mentioned stud, means holding the last mentioned gears in mesh and said links permitting adjustment of the spindle without unmeshing the gears and permitting the idler gear to move and cooperate with the movable bearing to compensate for relative movement of the spindle mounted and slide carried gears.

3. A work holding turret comprising a body, a flange at one end of said body, a flange at the other end of the body and having a plurality of flat faces, a lug on each of said faces, a plurality of spring plungers in the first mentioned flange, said plungers being equal in number to said lugs, and said plungers adapted to cooperate with said lugs to secure work in the turret.

4. A work holding turret comprising a body, a flange at one end of the body, a flange at the other end of the body and having a plurality of flat faces, a lug on each of said faces, a flange intermediate said flanges, said intermediate flange having a plurality of notches equal in number to said lugs, a plurality of spring plungers in the first mentioned flange, said plungers being equal in number to said lugs and notches and adapted to co-operate therewith to scure work in the turret.

5. In a milling machine, a cutter, a work holder adapted to hold a plurality of pieces to be operated on, means for giving said work holder a step-by-step turning movement, means for moving said cutter toward and away from said holder each time the latter is moved a step, said work holder having a notch for each piece of work it is adapted to carry, means for frictionally holding the pieces of work with a portion of each of said pieces disposed in its respective notch, and means operable to engage said pieces successively as they are engaged by the cutter to press them into and hold them in the notches during the cutting operation and thereby steady them in the holder during said operation.

Signed at Bridgeport in the county of Fairfield and State of Connecticut this 25th day of November A. D. 1925.

NEWMAN M. MARSILIUS.